United States Patent
Scherer et al.

(10) Patent No.: US 8,827,748 B2
(45) Date of Patent: Sep. 9, 2014

(54) ACTIVE KEYSTONE JACK

(76) Inventors: Christopher Briand Scherer, Austin, TX (US); Jonathon Keith Sholtis, Buda, TX (US)

( * ) Notice: Subject to any disclaimer, the term of this patent is extended or adjusted under 35 U.S.C. 154(b) by 34 days.

(21) Appl. No.: 13/822,283

(22) PCT Filed: Aug. 1, 2011

(86) PCT No.: PCT/US2011/001347
§ 371 (c)(1),
(2), (4) Date: Mar. 11, 2013

(87) PCT Pub. No.: WO2012/018381
PCT Pub. Date: Feb. 9, 2012

(65) Prior Publication Data
US 2013/0316583 A1    Nov. 28, 2013

Related U.S. Application Data

(60) Provisional application No. 61/400,917, filed on Aug. 4, 2010.

(51) Int. Cl.
  H01R 13/66    (2006.01)
  H04Q 1/02    (2006.01)
  H01R 24/64    (2011.01)

(52) U.S. Cl.
  CPC .......... H01R 13/6658 (2013.01); H04Q 1/136 (2013.01); H01R 24/64 (2013.01); H04Q 1/03 (2013.01)
  USPC ...................................... 439/620.23

(58) Field of Classification Search
  USPC ................. 439/620.23, 676, 557, 540.1; 379/27.01, 156, 25, 327; 340/8.1; 348/552
  See application file for complete search history.

(56) References Cited

U.S. PATENT DOCUMENTS

| | | | | |
|---|---|---|---|---|
| 5,885,111 A | * | 3/1999 | Yu | 439/676 |
| 6,454,611 B1 | * | 9/2002 | Francis | 439/676 |
| 8,070,531 B1 | * | 12/2011 | Ku et al. | 439/676 |
| 2010/0048064 A1 | * | 2/2010 | Peng | 439/676 |

* cited by examiner

*Primary Examiner* — Edwin A. Leon
(74) *Attorney, Agent, or Firm* — Michael A. Ervin; M. A. Ervin & Associates

(57) ABSTRACT

An advanced keystone jack for use in Ethernet cabling systems that enables the display of jack status, IP address, MAC address, power status, equipment type, location of far end, security setting on the jack and security lock-out status of the circuitry. The system is self contained and powered from POE power or a common power source.

14 Claims, 3 Drawing Sheets

ACTIVE KEYSTONE JACK

FIELD OF THE INVENTION

The present invention relates generally to modular receptacle jacks used in cable connection systems used in local area networks (LANS). More particularly, the present invention relates to modular jacks that have been improved to include means to provide visual verification of connections. Still more particularly the invention relates to such cable connection systems in which it is desired to trace remote connective portions of networking cables from jacks.

BACKGROUND OF THE INVENTION

The purpose of any networking cable is to carry signals from one electronic device to another. The term signals can mean data signals, power, or telephone communications. Electronic devices include but are not limited to terminals, personal computers, printers, workstations, hubs, switches, storage devices, tape drives, routers, telephone switches, and servers. Networking cables, frequently referred to, as "jumper cables", "patch cables", or simply "cables", typically are multiple pair copper wires packaged in an outer flexible sheath. Networking cables are designed to interconnect an electronic device with another electronic device. Such networking cables often are used in systems where there are many networking cables connected to frames, panels, or electronic devices, each of which may have many connecting cables and which may be located closely adjacent other similar frames, panels, or electronic devices, sometimes without carefully regimented management of the cables. The connections of each cable may be remote from one another, even being in separate rooms or spaces, and the networking cables may be of substantial length.

A keystone jack is a female connector used in data, signal, or telephone communications, particularly local area networks (LANs). The jack is usually mounted in a wall plate or patch panel. A keystone plug is the matching male connector, usually attached to the end of a cable or cord.

A principal advantage of keystone connectors is their versatility. Several types of keystone jacks can be mounted on a single patch panel. They are available in unshielded and shielded forms, and can accommodate cords and cables having various numbers of conductors.

The term keystone derives from the characteristic shape of the jack, resembling the standard RJ-11 wall jack used to connect telephone sets, fax machines, and dial-up computer modems to conventional telephone lines.

A patch panel is a mounted hardware unit containing an assembly of port locations in a communications or other electronic or electrical system. In a network, a patch panel serves as a sort of static switchboard, using cables to interconnect computers within the area of a local area network (LAN) and to the outside for connection to the Internet or other wide area network (WAN). A patch panel uses a sort of jumper cable called a patch cord to create each interconnection.

Today's keystone or wall jacks and patch panels often have a number of issues. For many there is no indication whether the jack is actually active and whether it has power. In addition the jack does not indicate the IP address or MAC address it is attached to. There is no indication of what type of equipment can be interfaced to the jack, no indication of the location of the far end of the cable and no indication of the security lock-out status of the connection.

The keystone jack to be described addresses these needs.

BRIEF SUMMARY OF THE INVENTION

The needs are addressed by an active keystone jack that is part of a network of signal communications including at least: a housing formed by front, rear, top, and side walls and having a plug receiving opening formed within a front faceplate; a terminator block; a front electronic display adapted to display alphanumeric data; a printed circuit board pre-programmed to sense and display: whether the keystone jack is active or not; whether power is currently present on the active keystone jack; the IP addresses of the various equipment attached to the active keystone jack; the MAC addresses of various equipment attached to the active keystone jack; the location of the far end of the network; the security lock-out status of the active keystone jack; the security settings on the active keystone jack; the type of equipment that is attached to the active keystone jack; wherein the printed circuit board is adapted with dip switches that can set alternate levels of security of the circuit; and wherein said front electronic display is used to display all of the different information sensed by the printed circuit board.

The need is also addressed by an active keystone jack that is part of a network of signal communications comprising: a housing formed by front, rear, top, and side walls and having a plug receiving opening formed within a front faceplate; a terminator block; a front array of light emitting diodes; a printed circuit board pre-programmed to sense and display: whether the keystone jack is active or not; whether power is currently present on the active keystone jack; the location of the far end of the network; the security lock-out status of the active keystone jack; the security settings on the active keystone jack; the type of equipment that is attached to the active keystone jack; wherein the printed circuit board is adapted with dip switches that can set alternate levels of security of the circuit; and wherein said front array of light emitting diodes is adapted to display all of the different information sensed by the printed circuit board.

In another aspect the terminator block an be a 8 or 10 conductor RJ-45.

In another aspect the power for the active keystone jack can be supplied by Power over Ethernet.

In another aspect the power for the active keystone jack can be supplied by a common power source.

In another aspect the front electronic display or the array of light emitting diodes can be mounted directly on the active keystone jack.

In another aspect the front electronic display or the array of light emitting diodes can be mounted directly on the faceplate of the active keystone jack.

In another aspect the front electronic display or the array of light emitting diodes can be mounted on the wall in proximity to the active keystone jack.

DETAILED DESCRIPTION OF THE INVENTION

Networking cables often are used in systems where there are many networking cables connected to frames, panels, or electronic devices, each of which may have many connecting cables and which may be located closely adjacent other similar frames, panels, or electronic devices, sometimes without carefully regimented management of the cables. The connections of each cable may be remote from one another, even being in separate rooms or spaces, and the networking cables may be of substantial length.

Figure 1:
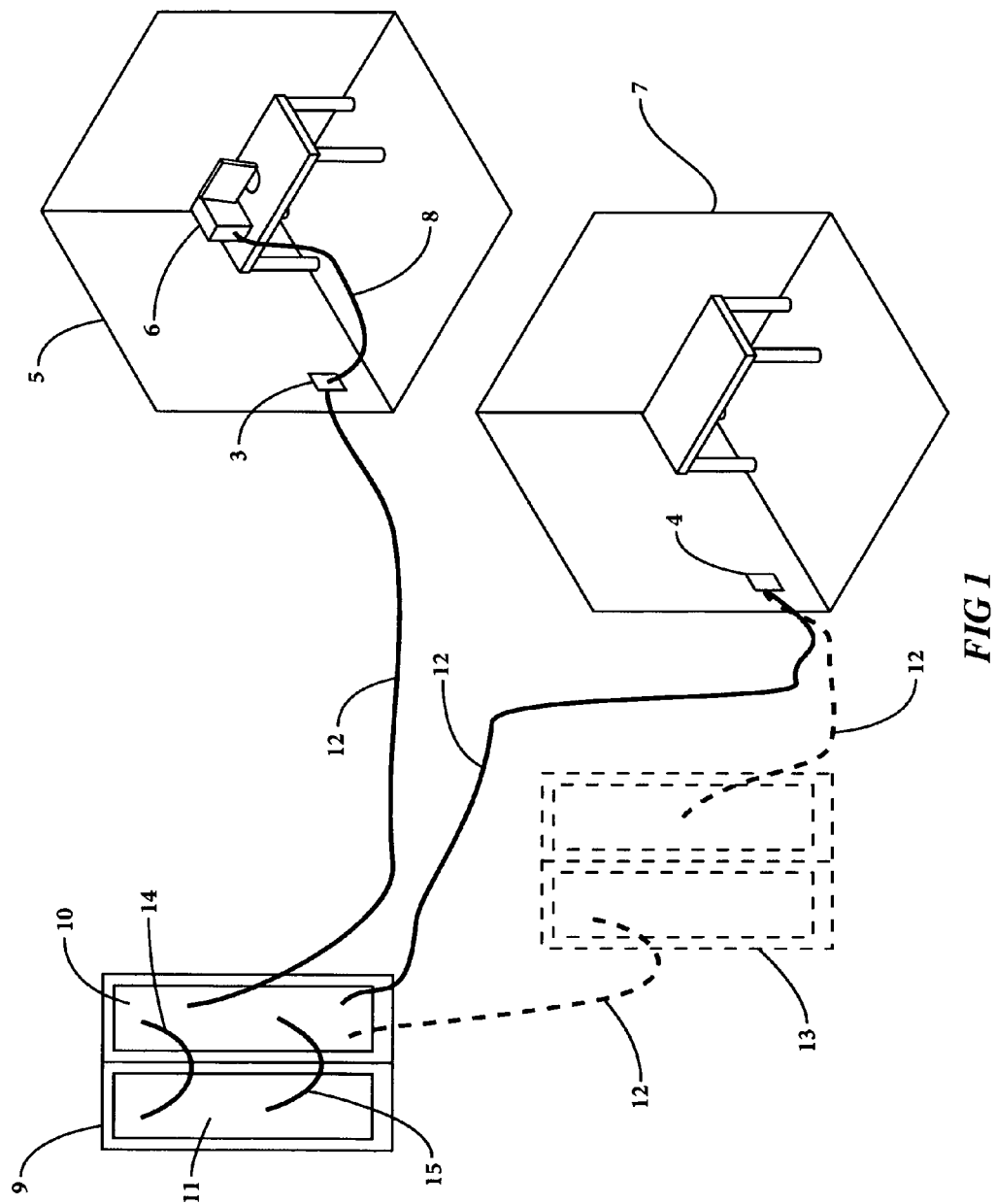
FIG. 1 is a schematic view of a networked computer environment.

FIG. 1 illustrates a fairly simple but typical network that may be in place in a business office. In this example two different offices 5 and 7 have at least one keystone jack 3,4 in each office. Office 5 is also shown with a workstation 6 that is attached to keystone jack 3.

Located remotely in a service room or an electronics cabinet is a main distribution frame 9. The main distribution frame (MDF) could be further connected to a wide variety of electronic devices such as printers, workstations, hubs, switches, storage devices, tape drives, routers, telephone switches, servers, etc. The MDF may consist of a series of patch panels 10, 11. Ethernet or LAN cables 12 from the office jacks are shown as connected to patch panel 10. Patch panel 10 is then connected to patch panel 11 with additional patch cords 14 and 15. In typical networked systems there can also be intermediate distribution frames (IDF) 13 containing additional patch panels (all shown in dotted lines)—again joined by patch cords (not shown).

Office 7 is shown with no current workstations and therefore no patch cords.

Figure 2:
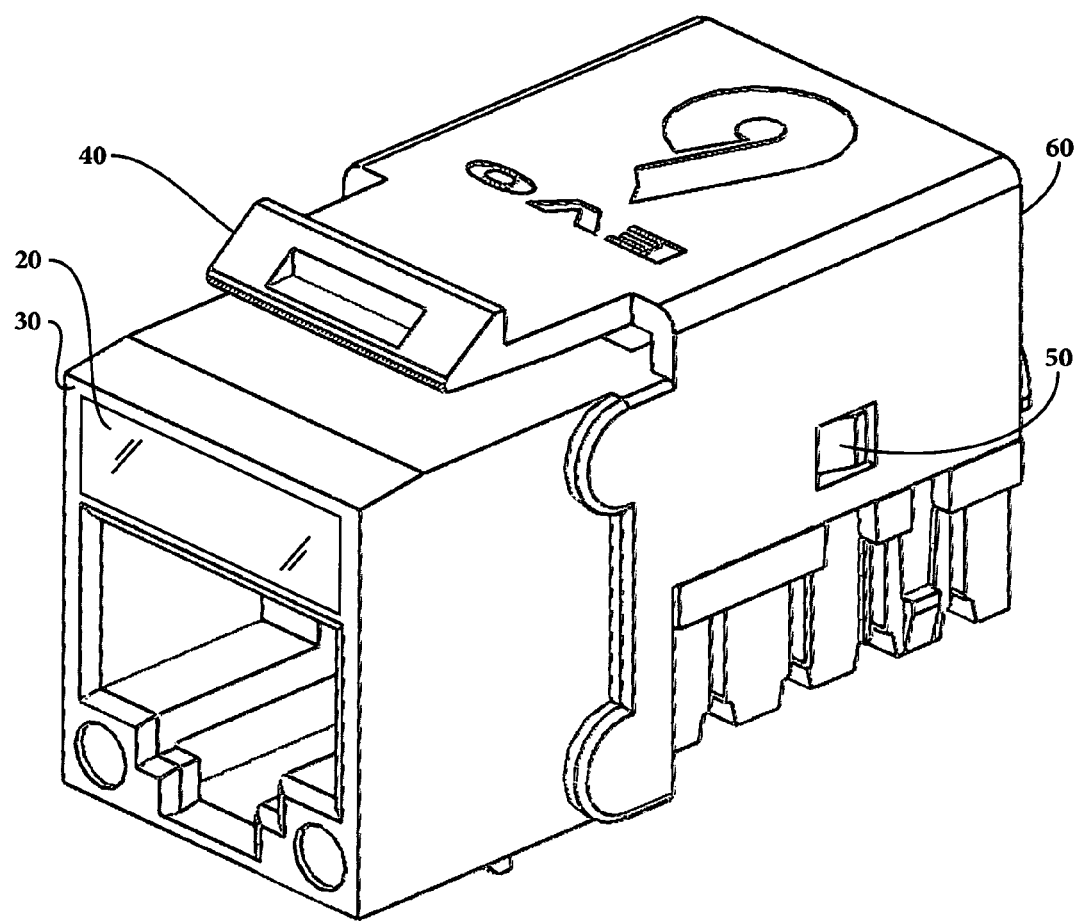
FIG. 2 is a front perspective view from above of an active keystone jack.

FIG. 2 illustrates a front perspective view from above of the active keystone jack of the instant invention. The jack has a front faceplate 30 and a back faceplate 60. On the front faceplate 30 of the active keystone jack is a display 20 which could be in one embodiment an array of LED's or could be a more conventional display that reads out alphanumeric data. A locking tab 50 for the terminator block is also shown.

The power for the display capability of the active keystone jack is supplied from Power Over Ethernet (POE), a technology for safely passing electrical power, along with other signals on Ethernet cabling. Other common power sources could also be used—such as AC adaptors, AC/DC adaptors, or AC/DC converters. These common power sources have other names such as plug packs, pug-in adaptors, adaptor blocks, wall warts, power bricks, etc. The invention anticipates that any of these could be used in addition to POE power.

Figure 3:
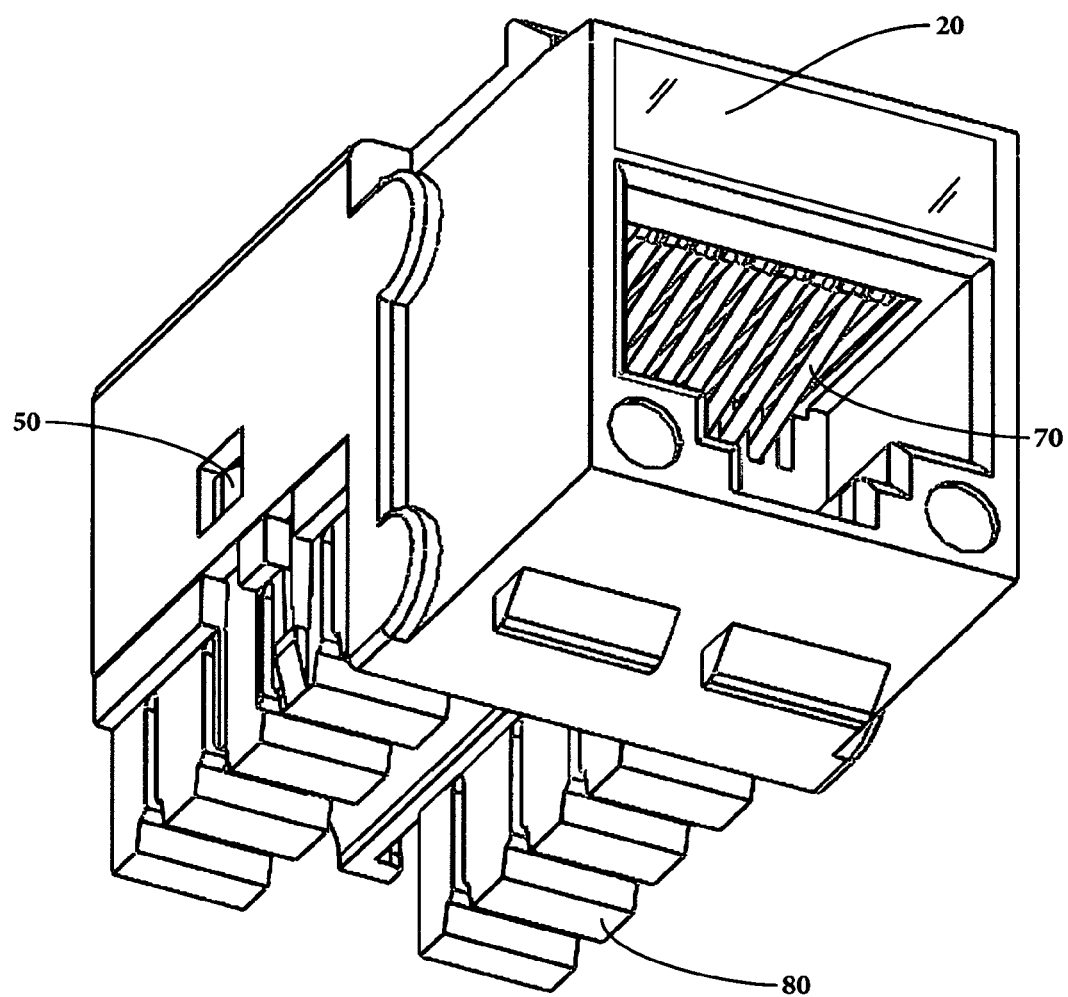
FIG. 3 is a front perspective view from below of an active keystone jack.

FIG. 3 illustrates a front perspective view from below of the active keystone jack of the instant invention. Seen from below are the RJ45 pins 70, which may be an 8 or 10 pin array. Also more evident from below is the terminator block 80, which again may be either 8 or 10 pin connectors. A typical connector is an RJ-45, an eight-wire connector commonly used in networking computers. Another embodiment embodiment for the instant invention is the use of a 10 conductor RJ-45. The use of a 10 conductor RJ-45 allows the insertion of an additional cable pair from the main distribution frame (MDF) to the intermediate distribution frame (IDF), which enables a continuous continuity path that enables the use of the telltale light indicator on each end of the cable.

Not shown but enclosed internally is a printed circuit board that includes the chipset and circuitry for all of the intelligence of the active jack. The chip is pre-programmed to be able to sense all of the key parameters of the inventive concept (jack status, IP address, MAC address, power status, equipment type, location of far end, jack security settings, security lock-out status), and to display that information on the display 20 on the front face of the jack.

In another aspect the circuit board can be adapted to be easily set to medium, medium-high, or high levels of security of the circuit. The security settings of the pre-programmed printed circuit board of each jack can be set to either deny service for some uses, or for some offices, or to limit for example internet use in some offices. This can be done by any number of techniques such as dip switches, slider switches or jumper pins, for example. When any of these approaches do control a particular jack there will be a message generated that there is a security lockout. In addition the display can display the particular security settings of that jack.

By way of explanation when doing routine maintenance on networked systems it is often useful to know the IP address and/or the MAC address of various components in the system. The IP (internet protocol) address is a numerical label assigned to each device in a network that uses the internet protocol for communication. IP addresses are binary numbers but they are usually stored in text files and displayed in human readable notations. The MAC (media access control) address is a unique identifier that is assigned to network interfaces for communication on physical network segments. MAC addresses are most often assigned by the manufacturer of a network interface card (NIC) and are stored in its hardware, the card's read only memory or some other firmware mechanism.

Because of these addresses each device on network has a unique physical address. For communication on a network are two physical addresses required for the sending and receiving devices. For data transfer across an internetwork will be used two MAC addresses. One is MAC address from the sending machine and other one from the receiving machine. Because the printed circuit board of each jack is programmed to read either IP addresses or MAC addresses and network personnel know the unique addresses of all of the potential equipment on the network, the display of IP and MAC addresses on the keystone jack allows identification of both the near and far elements operational on the network.

With the display panel 20 being a conventional alphanumerical display and with the internal programmed circuit board the display can display both the IP address and the MAC address of connected equipment.

In addition several other useful parameters are programmed to display on display panel 20. These include at least:

| | |
|---|---|
| Jack Status | Whether the jack is active or disabled |
| Power Only | No signal present - only power is present |
| Signals Present | Jack has signals and is ready to communicate |
| Security lock-out | Jack is deactivated by security issue |
| Trouble Alarm | Displays preprogramed alarm messages |
| Start and End | Displays beginning and end of cable run |
| Security Level | Displays restrictions placed on this jack |
| Equipment Attached | Displays type of equipment attached to jack |

As previously mentioned all of these alphanumeric data can be displayed using a standard alphanumeric display as shown in FIGS. 2 and 3. In another aspect the display, instead of being an alphanumeric display, could be an array of light emitting diodes (LEDs) on the front faceplate 30 of the keystone jack. Each diode could be a different color and combinations of the different colors could represent each if the parameters listed in the table. Either approach is anticipated by this description. Either display option could be on the front of the keystone jack, the front faceplate of the jack, or mounted on the wall in close proximity to the jack. All of these options are anticipated by the description of the keystone jack.

The utility of the described invention is very important to the ongoing maintenance of complex information technology networks. In a large business, banking or government establishment the required networks can be very complex, spanning multiple floors and often requires multiple technicians operating on multiple floors and often in the cramped environments of equipment closets. The active jack system described herein allows very rapid ascertainment of the status and connectivity of every active jack in the network by one technician and allows users of the network a quick understanding of the jacks available in any office they enter.

While the invention has been described above with references to specific embodiments thereof, it is apparent that many changes, modifications and variations in the materials, arrangements of parts and steps can be made without departing from the inventive concept disclosed herein. Accordingly, the spirit and broad scope of the appended claims are intended to embrace all such changes, modifications and variations that may occur to one of skill in the art upon a reading of the disclosure.

The invention claimed is:

1. An active keystone jack that is part of a network of signal communications comprising:
   a. a housing formed by front, rear, top, and side walls and having a plug receiving opening formed within a front faceplate;
   b. a terminator block;
   c. a front electronic display adapted to display alphanumeric data;
   d. a printed circuit board pre-programmed to sense and display:
      i. whether the jack is active or not;
      ii. whether power is currently present on the active keystone jack;
      iii. the IP addresses of the various equipment attached to the active keystone jack;
      iv. the MAC addresses of various equipment attached to the active keystone jack;
      v. the location of the far end of the network;
      vi. the security lock-out status of the active keystone jack;
      vii. the security settings on the active keystone jack;
      viii. the type of equipment that is attached to the active keystone jack;
   e. wherein the printed circuit board is adapted to set alternate levels of security of the active keystone jack;
   f. wherein said front electronic display is used to display all of the different information sensed by the printed circuit board of element (d).

2. The active keystone jack of claim 1 wherein said terminator block is an 8 or 10 conductor RJ-45.

3. The active keystone jack of claim 1 wherein the active keystone jack is powered by Power Over Ethernet.

4. The active keystone jack of claim 1 wherein the active keystone jack is powered by a common power source.

5. The active keystone jack of claim 1 wherein the front electronic display is mounted directly on the active keystone jack.

6. The active keystone jack of claim 1 wherein the front electronic display is mounted on the faceplate of the active keystone jack.

7. The active keystone jack of claim 1 wherein the front electronic display is mounted on the wall in proximity to the active keystone jack.

8. An active keystone jack that is part of a network of signal communications comprising:
   a. a housing formed by front, rear, top, and side walls and having a plug receiving opening formed within a front faceplate;
   b. a terminator block;
   c. a front array of light emitting diodes;
   d. a printed circuit board pre-programmed to sense and display:
      i. whether the jack is active or not;
      ii. whether power is currently present on the active keystone jack;
      iii. the location of the far end of the network;
      iv. the security lock-out status of the active keystone jack;
      v. the security settings on the active keystone jack;
      vi. the type of equipment that is attached to the active keystone jack;
   e. wherein the printed circuit board is adapted to set alternate levels of security on the active keystone jack;
   f. wherein said front array of light emitting diodes is adapted to display all of the different information sensed by the printed circuit board of element (d).

9. The active keystone jack of claim 1 wherein said terminator block is an 8 or 10 conductor RJ-45.

10. The active keystone jack of claim 1 wherein the active keystone jack is powered by Power Over Ethernet.

11. The active keystone jack of claim 1 wherein the active keystone jack is powered by a common power source.

12. The active keystone jack of claim 1 wherein the front array of light emitting diodes is mounted directly on the active keystone jack.

13. The active keystone jack of claim 1 wherein the front array of light emitting diodes is mounted on the faceplate of the keystone jack.

14. The active keystone jack of claim 1 wherein the front array of light emitting diodes is mounted on the wall in proximity to the active keystone jack.

* * * * *